US005600718A

United States Patent [19]

Dent et al.

[11] Patent Number: 5,600,718

[45] Date of Patent: Feb. 4, 1997

[54] APPARATUS AND METHOD FOR ADAPTIVELY PRECOMPENSATING FOR LOUDSPEAKER DISTORTIONS

[75] Inventors: Paul W. Dent, Stehag; Jim A. J. Rasmusson, Brosrap, both of Sweden; Ronald J. Johnsen, Cary, N.C.

[73] Assignee: Ericsson Inc., Research Triangle Park, N.C.

[21] Appl. No.: 393,726

[22] Filed: Feb. 24, 1995

[51] Int. Cl.[6] .......... H04M 9/08

[52] U.S. Cl. .......... 379/406; 379/388; 379/410; 379/411

[58] Field of Search .......... 379/406, 407, 379/408, 409, 410, 411, 412, 402, 345, 388, 392; 370/32.1; 381/47, 66, 71, 83, 96, 98

[56] References Cited

U.S. PATENT DOCUMENTS

| | | | |
|---|---|---|---|
| 4,340,778 | 7/1982 | Cowans et al. | 179/1 D |
| 4,426,552 | 1/1984 | Cowans et al. | 381/71 |
| 4,468,641 | 8/1984 | Duttweiler et al. | 333/166 |
| 4,584,441 | 4/1986 | Chance et al. | 179/170.2 |
| 4,709,391 | 11/1987 | Kaizer et al. | 381/98 |
| 4,712,235 | 12/1987 | Jones, Jr. | 379/410 |
| 5,062,102 | 10/1991 | Taguchi | 370/32.1 |
| 5,084,865 | 1/1992 | Koike | 370/32.1 |
| 5,131,032 | 7/1992 | Esaki et al. | 379/410 |
| 5,193,112 | 3/1993 | Sano | 379/410 |
| 5,237,562 | 8/1993 | Fujii et al. | 370/32.1 |
| 5,263,019 | 11/1993 | Chu | 370/32.1 |
| 5,263,020 | 11/1993 | Yatsuzuka et al. | 370/32.1 |
| 5,280,525 | 1/1994 | Wesel | 379/400 |
| 5,305,309 | 4/1994 | Chujo et al. | 370/32.1 |
| 5,307,405 | 4/1994 | Sih | 379/410 |
| 5,315,585 | 5/1994 | Iizuka et al. | 370/32.1 |
| 5,319,585 | 6/1994 | Amrany | 364/724.19 |
| 5,408,530 | 4/1995 | Makino et al. | 379/410 |
| 5,414,766 | 5/1995 | Cannalire et al. | 379/410 |

FOREIGN PATENT DOCUMENTS

| | | |
|---|---|---|
| 0508392A2 | 10/1992 | European Pat. Off. . |
| WO92/10876 | 6/1992 | WIPO . |

OTHER PUBLICATIONS

International Search Report, PCT/US96/02039, Jul. 24, 1996.

Roberts & Mullis, Least–Squares Filter Design, *Digital Signal Processing,* Addison–Wesley, Chapter 7, p. 229 (1987).

Rabiner et al., Pitch Period Estimation Using the Autocorrelation Function, Digital Processing of Speech Signals, *Bell Laboratories, Inc.,* Prentice Hall International, Inc., p. 150 (1978).

Park, Full–Duplex Speakerphone with Acoustic and Electric Echo–Canceller Utilizing the DSP56200 Cascadable Adaptive FIR Filter Chip, *Proc. of Midcon,* Technical Conference on Electronic and Electrical Technology, Dallas, TX, 9/11–13, 1990.

(List continued on next page.)

*Primary Examiner*—Thomas W. Brown
*Assistant Examiner*—Jacques M. Saint-Surin
*Attorney, Agent, or Firm*—Bell, Seltzer, Park & Gibson

[57] ABSTRACT

In an audio system, a loudspeaker responds to an input signal producing a sound pressure wave having a linear component, which is linear function of the input signal, and an undesired non-linear component, which is a non-linear function of the input signal. Accordingly, it is desirable to reduce the non-linear component of the output sound pressure wave. An adaptive precompensating audio system for reducing this non-linear component includes a loudspeaker for producing a sound pressure wave and a precompensating filter for precompensating an input signal representative of the desired sound pressure wave. In addition, a microphone may be used to convert the resulting sound pressure wave into a sound signal and a precompensating filter modifier may be used to modify the precompensating filter in response to the sound signal. Preferably, the precompensating filter transforms the input signal using an inverse of an estimated transfer function for the loudspeaker.

23 Claims, 1 Drawing Sheet

OTHER PUBLICATIONS

Murano et al., Echo Cancellation and Applications, *IEEE Communications Magazine,* p. 49 (1990).

Armbruster, High Quality Hands–Free Telephony Using Voice Switching Optimised with Echo Cancellation, *Signal Processing IV:* Theories and Applications, p. 495 (1988).

Hsu et al., Acoustic Echo Cancellation for Loudspeaker Telephones, *IEEE, GLOBECOM,* CH–2520–5, p. 1955 (1987).

Boll, Suppression of Acoustic Noise in Speech Using Spectral Subtraction, *IEEE Transactions on Acoustics, Speech, and Signal Processing,* vol. ASSP–27, No. 2 (1979).

Noble, Simulation of an Adaptive Echo Canceller for Carphone Hands–Free Units, *Rascal Research Limited,* UK, Session 2.4, p. 456.

Burnett et al., Echo Cancellation in Mobile Radio Environments, *IEEE,* p. 7/1–4 (1988).

Park et al., Acoustic Echo Cancellation for Full–Duplex Voice Transmission on Fading Channels, *Proc. of International Mobile Satellite Conference,* (1990).

Vries, Digital Compensation of Nonlinear Distortion in Loudspeakers, *IEEE,* p. I–165 (1993).

Full, Duplex Speakerphone with Acoustic and Electric Echo Canceler, Sangil Park, Techn. Conf. Dallas, Tx. Sep. 13, 1990.

APPARATUS AND METHOD FOR ADAPTIVELY PRECOMPENSATING FOR LOUDSPEAKER DISTORTIONS

This application is related to application Ser. No. 08/393711 entitled "Apparatus and Method for Canceling Acoustic Echoes Including Non-Linear Distortions in Loudspeaker Telephones," filed Feb. 24, 1995, and assigned to the assignee of the present invention, the disclosure of which is hereby incorporated in its entirety herein by reference.

FIELD OF THE INVENTION

This invention relates to the field of audio systems, and more particularly to the suppression of sound distortion in a loudspeaker.

BACKGROUND OF THE INVENTION

An audio system includes an output transducer, such as a loudspeaker, to produce a sound pressure wave in response to an input signal representative of a desired sound pressure wave. Most loudspeakers, however, generate an actual sound pressure wave that differs from the desired sound pressure wave represented by the input signal. This difference is due, in part, to non-linear aspects of the loudspeaker. In particular, the diaphragm of a loudspeaker has a non-linear stress-strain curve. Furthermore, the motion of the diaphragm results in the delay modulation of higher frequencies by lower frequencies. Accordingly, there have been efforts in the art to compensate for these and other factors which cause a loudspeaker to produce an actual sound pressure wave which is different from the desired sound pressure wave.

For example, U.S. Pat. Nos. 4,426,552 and 4,340,778 both to Cowans et al. and both entitled "Speaker Distortion Compensator," disclose means coupled to each speaker in a system for compensating for mass, compliance, and damping. The processing circuits are exemplified by active and passive circuits which provide a feedforward component which nullifies the spurious emanations that would otherwise develop as the loudspeaker diaphragm attempts to follow complex motions that are otherwise impermissible because of its dynamics.

U.S. Pat. No. 4,709,391 to Kaiser et al. entitled "Arrangement For Converting An Electric Signal Into An Acoustic Signal Or Vice Versa And A Non-Linear Network For Use In The Arrangement" discloses an arrangement including means for reducing distortion in the output signal. The reducing means comprise a non-linear network arranged for reducing non-linear distortion by compensating for at least a second or higher order distortion component in the output signal.

Furthermore, the article by de Vries et al. entitled "Digital Compensation of Nonlinear Distortion in Loudspeakers," IEEE, 1993, pp. I-165 to I-167, discloses a method to compensate for non-linear distortions produced by a loudspeaker in real-time by non-linear digital signal processing. An electrical equivalent circuit of an electrodynamic loudspeaker is developed resulting in a linear lumped parameter model. The linear model is extended to include non-linear effects, and an inverse circuit is implemented in real-time on a digital signal processor.

Notwithstanding the above mentioned references, there continues to exist a need in the art for improved audio systems and methods which compensate for the non-linear aspects of a loudspeaker. This need is critical in telephony and particularly in speakerphone applications where a small loudspeaker is used. This need is even more critical in cellular speakerphone applications where intelligibility is difficult to begin with.

SUMMARY OF THE INVENTION

Therefore, it is an object of the present invention to provide an improved audio system.

It is another object of the present invention to provide an improved cellular radiotelephone.

It is still another object of the present invention to provide an improved audio system and method for precompensating for non-linear aspects of a loudspeaker in order to reduce non-linear loudspeaker distortions.

It is still another object of the present invention to provide an improved precompensating cellular radiotelephone.

These and other objects are provided according to the present invention by providing an adaptive precompensating method and system which modifies the operation of a precompensating filter in an audio system in response to the output of the loudspeaker. Accordingly, the precompensating filter operations are not fixed but rather are varied over time. Accordingly, the precompensating filter operation can be modified to account for aging of the loudspeaker and other effects such as changes in the environment in which the system is operated.

In a preferred embodiment, a model of the electrical characteristics of a loudspeaker is used to derive an approximation of a transfer function of the loudspeaker. An inverse of this transfer function is performed by the precompensating filter on the input signal which represents the desired loudspeaker output. The precompensated signal is then applied to the loudspeaker. Accordingly, the output of the loudspeaker more closely resembles the desired loudspeaker output. An input transducer, such as a microphone, is used to provide a feedback loop from the loudspeaker to the precompensating filter so that the precompensating filter can compare the actual loudspeaker output with the desired output. This feedback allows the precompensating filter to adapt the approximated inverse transfer function in order to improve its operation.

The present invention is preferably applied to a loudspeaker cellular radiotelephone designed for hands free operation. This application is particularly appropriate because the loudspeaker telephone includes a loudspeaker and a microphone. Because the loudspeaker is typically constrained in its size and required to produce a sound pressure waveform having a relatively high amplitude, the distortions produced by the loudspeaker can be more pronounced than the distortions produced in other audio systems. Furthermore, loudspeaker cellular telephones are often used in inherently noisy environments, such as an automobile, making their use difficult to begin with. Accordingly, the precompensating filter can be used to reduce the distortions generated by the small loudspeakers used in these applications thereby making the reproduced sound more understandable.

The present invention may also be applied to hi-fi audio systems by including a microphone to provide feedback. In either application, the system can be used to monitor the loudspeaker output and adapt the operation of the precompensating filter as needed. The system can adapt its operation to account for aging, as well as environmental changes such as the acoustical characteristics of the space in which the system operates.

The operation of the present invention can be further improved by including an echo filter which provides an estimate of the echo or ring-around signal from the loudspeaker to the microphone. This estimated echo signal is then subtracted from, or combined with, the sound signal generated by the microphone, thereby reducing the echo portion of the sound signal in the feedback loop to the precompensating filter. Accordingly, the precompensating filter can more accurately modify its operation.

The echo filter can be provided with another feedback loop. By comparing the estimated echo signal with the actual echo signal, the echo filter can modify its operation in order to further reduce the echo portion of the signal. The reduction of non-linear aspects of the loudspeaker by the precompensating filter allows the echo filter to more accurately modify its own operation.

In a most preferred embodiment, both the precompensating filter and the echo filter are implemented in a digital signal processor ("DSP"). In this embodiment, analog-to-digital and digital-to-analog converters can be used.

DETAILED DESCRIPTION OF A PREFERRED EMBODIMENT

The present invention will now be described more fully hereinafter with reference to the accompanying drawings, in which preferred embodiments of the present invention are shown. This invention may, however, be embodied in many different forms and should not be construed as limited to the embodiment set forth herein; rather, these embodiments are provided so that this disclosure will be thorough and complete, and will fully convey the scope of the invention to those skilled in the art. Like numbers refer to like elements throughout.

Figure 1:
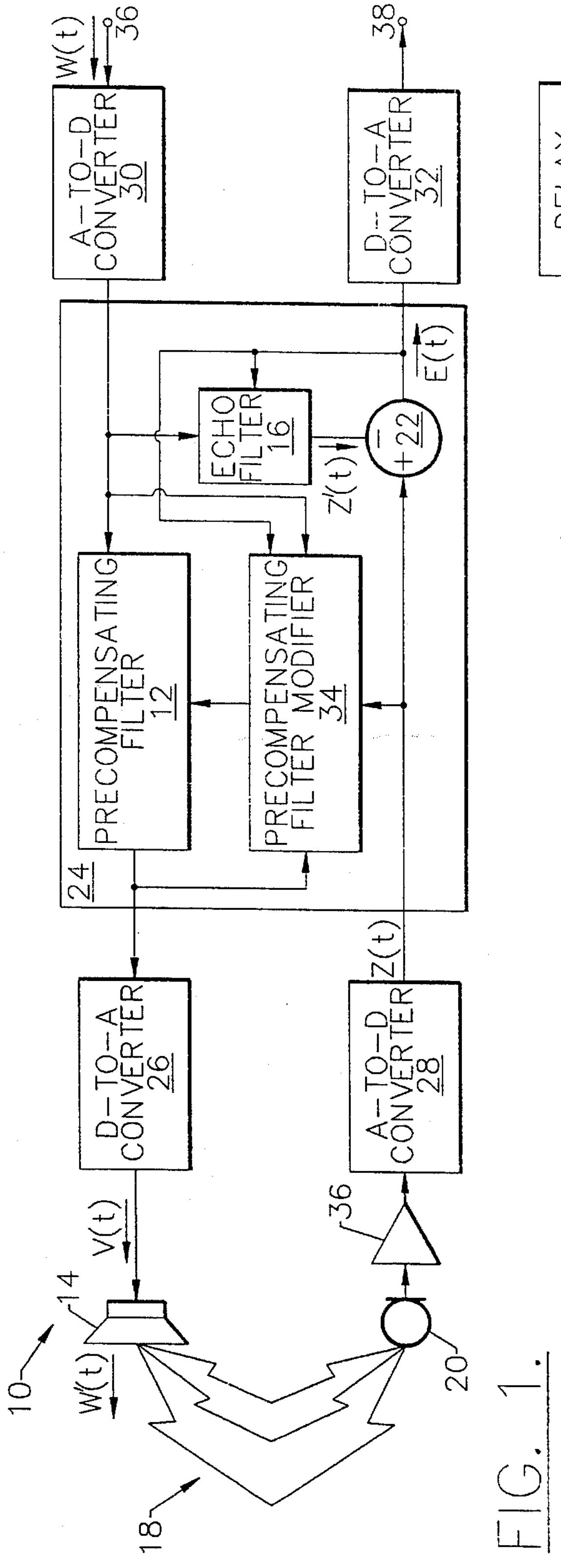
FIG. 1 is a schematic diagram of an audio system according to the present invention including a loudspeaker, a precompensating filter, and a finite-impulse-response filter.

The audio system 10 shown in FIG. 1 includes precompensating means such as adaptive precompensating filter 12 for reducing the effects of non-linear aspects of the output transducer means, preferably implemented as loudspeaker 14. The system also includes an adaptive echo filter 16 for reducing environmental distortions due to the multi-path channel 18 from the loudspeaker 14 to the input transducer means, preferably implemented as microphone 20. In combination, the precompensating filter and echo filter enhance the operation of each other. The loudspeaker 14 characteristics can be represented by a transfer function H having both linear and non-linear components. By approximating an inverse $\underline{H}^{-1}$ of the loudspeaker transfer function H, the precompensating filter 12 is able to reduce the non-linear distortions generated by the loudspeaker. A precompensating filter modifier 34 in the feedback loop from the precompensating filter 12 through the loudspeaker 14 and multi-path channel 18 to the microphone 20 and back to the precompensating filter 12 can modify or adapt the approximated inverse transfer function $\underline{H}^{-1}$ of the precompensating filter to further reduce non-linear distortions generated by the loudspeaker. The precompensating filter modifier can include a memory for storing portions of the various waveforms such as W(T), V(t), Z(t), and E(t) for comparison.

The echo filter 16 may be used to generate an approximation of environmental distortions, such as echo or ring-around, occurring over multi-path acoustic channel 18 between the loudspeaker 14 and the microphone 20. This approximation can be combined with the sound signal generated by the microphone 20 through combination or subtraction means, such as subtractor 22, to reduce undesired environmental distortions such as echo or ring-around in the signal. Modification means, including a feedback loop from the echo filter 16 through the subtractor 22 and back to the echo filter 16, allows the echo filter to modify its operation so as to further reduce the effects of environmental distortions. In a cellular telephone with a loudspeaker, the echo filter 16 reduces feedback of the loudspeaker output to the distant party.

By combining the precompensating filter 12 and echo filter 16, distortions due to non-linear aspects of the loudspeaker 14 and distortions due to the multi-path channel 18 from the loudspeaker 14 to the microphone 20 may be reduced further than either alone would allow. That is, the precompensating filter 12 reduces non-linear distortions that could not otherwise be accounted for by the echo filter 16, while the echo filter 16 reduces environmental distortions that would otherwise be unaccounted for by the precompensating filter 12. In other words, each of the precompensating filter and the echo filter reduce distortions in the feedback loop for the other. Accordingly, the operation of each of the precompensating filter and the echo filter can be modified to more closely approximate a desired level of operation.

FIG. 1 also shows that the precompensating filter 12, the echo filter 16, precompensating filter modifier 34, and the subtractor 22 may be incorporated into a single digital signal processor 24 ("DSP"). When implemented as a digital signal processor 24, the invention may require a digital-to-analog ("D-to-A") converter 26 between the DSP 24 and the loudspeaker 14 and an analog-to-digital ("A-to-D") converter 28 between the microphone 20 and the DSP 24. In addition, A-to-D converter 30 and D-to-A converter 32 may be required if signals are supplied from or to an analog source. The system may also include an amplifier 36.

When implemented as a loudspeaking cellular telephone, an input speech waveform W(t) representative of the distant party speech is received by the telephone transceiver from a cellular telephone system base station, and after suitable processing is applied at input node 36. In a mobile cellular telephone system, such processing can include demodulation of a digitally modulated radio signal, error correction decoding, and speech decoding using, for example, a Residually Excited Linear Prediction ("RELP") or Vector Set Excited Linear Prediction ("VSELP") speech synthesizer. The waveform W(t) is the result of such processing, and may be in a digital format which is more suitable for processing by the echo canceler of the present invention. For example, if the telephone supplies a digital signal at input node 36 and requires a digital signal at node 38, A-to-D converter 30 and D-to-A converter 32 are not needed. If, however, the telephone provides an analog signal at node 36 and requires an analog signal at node 38, converters 30 and 32 may be required. Precompensating filter 12 reduces loudspeaker distortions while echo filter 16 reduces echo and ring-around.

In the loudspeaking cellular telephone embodiment, the training of the precompensating and echo filters can be performed continuously. Preferably, the training function is performed when only the distant party is speaking so that the relevant signals may be more easily isolated. This can be accomplished by comparing the input signal and the sound signal to determine when the microphone is receiving significant sound pressure waves generated by the loudspeaker alone and adapting the precompensating filter at that time. A device that determines when the signal out of the microphone is substantially derived from acoustic feed back is discussed, for example, in U.S. Pat. No. 5,263,019 to Chu entitled "Method and Apparatus for Estimating the Level of Acoustic Feedback Between a Loudspeaker and Microphone," the disclosure of which is hereby incorporated in its entirety herein by reference. Alternately, the training function may be preformed periodically by using test signals.

When implemented as a hi-fi audio system, the input signal at node 36 may be supplied by any of a number of digital or analog audio components such as a tuner, tape player, compact disk player, etc. In this embodiment, there may be no need for D-to-A converter 32 or output node 38, and the precompensating filter and echo filter work together to reduce loudspeaker distortions. The training function is preferably performed periodically using test signals which may be supplied by a tape or other signal input means.

Figure 2:
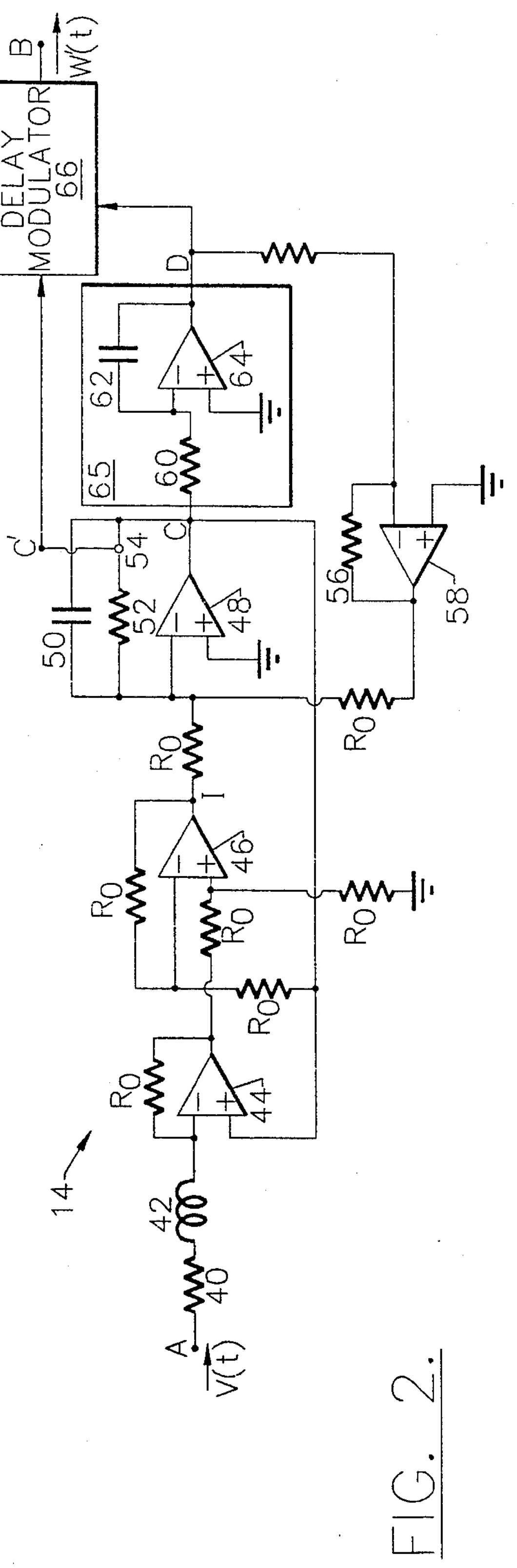
FIG. 2 is a schematic diagram representing a model of the electrical characteristics of the loudspeaker shown in FIG. 1.

FIG. 2 shows an analog model of the electrical characteristics of a typical loudspeaker 14. An electrical input signal is applied at input node A to create a current through the loudspeaker coil. The loudspeaker input signal is a precompensated input signal V(t) from the precompensating filter 12 shown in FIG. 1. The current flow is opposed by the coil resistance 40 and coil inductance 42, as well as the back EMF induced by the coil velocity in the magnetic field. By suitable choice of units and scaling in the model, the voltage at node C may be equal to the back-EMF as well as being representative of the coil velocity. The back EMF from node C is presented in opposition to the drive voltage at input node A by connection to the positive input of differencing operational amplifier 44. The output of amplifier 44 is the sum of the back EMF from node C and a term proportional to the current in the coil. Amplifier 46 subtracts the back EMF to yield a voltage representing the current in the coil only, and by suitable choice of arbitrary units, this voltage also represents the force the coil exerts on the loudspeaker diaphragm by the current reacting with the magnetic field produced by the loudspeaker magnet. As will be understood by those having skill in the art, the term diaphragm is used throughout this specification in its broadest sense so as to include a planar diaphragm, a dome shaped diaphragm, or a cone shaped diaphragm.

The force causes an acceleration of the loudspeaker diaphragm to a certain velocity which is resisted by the diaphragm's mass or inertia and by air resistance encountered. Operational amplifier 48 has a feedback capacitor 50 representing the diaphragm's mass and a feedback resistor 52, which might be non-linear, representing the air resistance acting against the diaphragm. The current flow through resistor 52 opposes the accelerating force and relates to the air pressure wave created by the diaphragm movement. Current sensor 54 generates a signal at node C' which represents this air pressure wave created by the diaphragm movement.

The pressure wave, however, emanates from a moving object, the diaphragm. When the diaphragm is instantaneously displaced to the front of the loudspeaker, it will be closer to a listener in front of the loudspeaker. Accordingly, sound waves will reach the listener with a shorter time delay than when the diaphragm is displaced toward the rear of the loudspeaker. Diaphragm displacements occur with greatest amplitude at low frequencies giving rise to the non-linear phenomenon of delay modulation (also known as phase modulation) of higher frequencies by lower frequencies. A signal representative of the diaphragm displacement is generated at node D by resistance 60, capacitance 62, and operational amplifier 64, which together make up integrator Thus the pressure wave signal from the diaphragm generated at node C' is subjected to delay modulation produced by delay modulator 66 according to the diaphragm displacement signal generated at node D in order to produce the net sound pressure waveform at output node B that is transmitted to a listener.

The diaphragm displacement signal generated at node D is also needed to model the diaphragm spring restoring force that opposes the force exerted by the coil which is represented by the coil force signal generated by operational amplifier 46. The diaphragm spring is expected to exhibit a non-linear stressstrain curve modelled by the non-linear resistor Operational amplifier 58, having non-linear resistor in its feedback path, converts the displacement-related signal generated at node D to a restoring force which adds in opposition to the coil force signal at the input of operational amplifier 48. The resistors labeled $R_0$ may be equal to 1 ohm.

Thus, with appropriate choice of parameters and scalings in the above-described model of FIG. 2, the sound pressure wave generated at loudspeaker output node B can be predicted from the electrical signal applied to the loudspeaker input node A. According to one aspect of the invention, the model discussed above is used in reverse to determine the electrical signal with which to drive the loudspeaker at input node A so as to obtain a desired sound pressure wave at output node B. In other words, the loudspeaker model is used to determine an approximate inverse of the transfer function of the loudspeaker. This may be done as described below.

The desired sound pressure wave is represented by an input signal W(t) which is applied at node 36, and converted to a digital signal by A-to-D converter 30 if necessary. The precompensating filter 12 generates a precompensated signal V(t) which is converted to an analog signal by D-to-A converter 26, if necessary. If signal V(t) is correctly generated, the output sound pressure wave W'(t) will be a close approximation of the desired sound pressure wave represented by signal W(t).

As shown in FIG. 2, the sound pressure waveform W'(t) is produced at output node B and may be represented by a sequence of numerical samples. These samples are expressed as:

$$\ldots, W(i-1), W(i), W(i+1), \ldots$$

These samples are approximately equal to the result of delay-modulating a signal U(t) at the node C' of FIG. 2, represented by samples, . . . , U(i−1), U(i), U(i+1), . . . , by the diaphragm displacement-related signal D(t) represented by samples, . . . , D(i−1), D(i), D(i+1), . . .

Because of non-linear resistor 52 which represents air resistance, the voltage across the resistor 52 at node C may be represented by a function F(U(t)). The function F(U(t)) is a function of the current signal generated at node C' so that signal values of function C(t) at node C, represented by samples, . . . , C(i−1), C(i), C(i+1), . . . , are given by the following equations:

$$\begin{aligned} C(i-1) &= F(U(i-1)) \\ C(i) &= F(U(i)) \\ C(i+1) &= F(U(i+1)) \text{ etc.} \end{aligned} \tag{1}$$

Integrator 65 integrates the signal C(t) at node C to obtain the signal D(t) at node D by using the discrete-time approximations:

$$D(i-1)=D(i-2)-C(i-2)dT \quad (2)$$
$$D(i)=D(i-1)-C(i-1)dT$$
$$D(i+1)=D(i)-C(i)dT \text{ etc.}$$

It can be seen that, to calculate D(i), only C(i–1) and thus U(i–1) is needed. Assuming that these samples were computed on a prior iteration and that we now wish to compute U(i), the delay modulation produced by delay modulator 66 is represented by a variable time-interpolation between the W'(t) sound pressure wave samples as follows. If there is no delay modulation:

$$D(i)=0;\ U(i)=W(i).$$

Otherwise, if there is delay modulation:

$$U(i)=W(i)+0.5(W(i+1)-W(i-1))D(i). \quad (3)$$

This calculation assumes a scaling in the integrator 65 such that signal D(t) is of the correct magnitude to insert in the above equation.

For example, if the sample rate is 8 k samples per second, time intervals (i–1), (i), (i+1), . . . , are 125 μS apart. In 125 μS, sound travels approximately 1.5 inches. Accordingly, the diaphragm displacement samples D(i) should be computed by integrator 65 in units of 1.5 inches. D(i) is expected to be much less than unity with this scaling. If D(i) is made equal to 1 unit, signifying a delay modulation of one whole sample, then the formula is changed to:

$$U(i)=W(i-1) \text{ for } D(i)=-1$$

and $$U(i)=W(i+1) \text{ for } D(i)=+1$$

or:

$$U(i)=0.5(W(i)+W(i+1)) \text{ for } D(i)=0.5$$

and $$U(i)=0.5(W(i)+W(i-1)) \text{ for } D(i)=-0.5.$$

Since D(i) is expected to be less than 0.5 however, equation (3) may be more appropriate.

In the equations shown above, the sign of the delay modulation has been arbitrarily assumed. It may be necessary to change the sign of the delay modulation, by altering the scaling of integrator 65. This may be accomplished by introducing a scaling factor into equation (2). Having determined D(i) from equation (2), U(i) from equation (3) and C(i) from equation (1), the current sample value I(i) into operational amplifier 48 can be determined using the following equation:

$$I(i)=-U(i)-(C(i)-C(i-1))*X+G(D(i)) \quad (4)$$

In this equation, C(i)–C(i–1) represents the rate of change of voltage at the output of operational amplifier 48, and X represents the diaphragm-mass parameter, capacitor 50, times dT.

The non-linear function G(t) represents the diaphragm restoring force versus displacement curve (stress-strain curve). The relative magnitudes or scalings of the air-resistance function F(t), the diaphragm-mass parameter X and the function G(t) are assumed to have been correctly chosen so that they may be added in equation (4) with no additional scaling factors.

The precompensated input voltage signal V(t) represented by samples, . . . , V(i–1), V(i), V(i+1), . . . , may now be calculated from the equation shown below:

$$V(i)=I(i)*R+(I(i)-I(i-1))*L/dT+C(i). \quad (5)$$

In this equation, R and L are the coil resistance 40 and inductance 42 respectively. In this way, a sequence, . . . , V(i–2), V(i–1), V(i), . . . , of the required input voltage samples may be calculated to produce the sound pressure wave samples, . . . , W'(i–2), W'(i–1), W'(i), . . . , which closely approximate the desired sound pressure samples represented by, . . . , W(i–2), W(i–1), W(i) . . .

The five most relevant equations are collected below:

$$C(i)=F(U(i)) \quad (1)$$

$$D(i)=D(i-1)-C(i-1)*dT \quad (2)$$

$$U(i)=W(i)+0.5(W(i+1)-W(i-1)*D(i) \quad (3)$$

$$I(i)=-U(i)-(C(i)-C(i-1))*X+G(D(i)) \quad (4)$$

$$V(i)=I(i)*R+(I(i)-I(i-1))*L/dT+C(i) \quad (5)$$

These five equations contain the following parameters:

| | |
|---|---|
| Non-linear air-resistance function | F |
| Integrator 65 scaling factor (delay modulation parameter) | dT |
| Diaphragm mass inertia parameter | X |
| Diaphragm spring stress-strain function | G |
| Coil resistance | R |
| Coil inductance parameter L/dT | Y = L/dT |

This number of parameters is sufficient to implement the model of FIG. 2. Since the parameter dT appears independently only in equation (2), it may be chosen to obtain the correct amount of delay modulation and is therefore not necessarily equal to the sample spacing. This calculation is allowable because the only other place that the parameter dT appears is in the term L/dT. By replacing the term L/dT with Y as shown above, the ability to independently represent the coil inductance effect is preserved.

If the amount of delay modulation is varied by choosing dT to give another scaling to D(t), it may be necessary to change the function G(t) to avoid altering the stress-strain curve of the diaphragm spring. To avoid this dependence, it may be more appropriate to transfer the delay modulation dT to the delay modulation equation (2) so that varying dT does not require G(t) to be altered in order to maintain the same stress-strain curve. Thus, the following equations are obtained.

$$D(i)=D(i-1)-C(i-1)$$
$$U(i)=W(i)+0.5(W(i+1)-W(i-1))*D(i)*dT$$
$$C(i)=F(U(i))$$
$$I(i)=-U(i)-(C(i)-C(i-1))*X+G(D(i))$$
$$V(i)=I(i)*R+(I(i)-I(i-1))*Y+C(i)$$

A further simplification is to assume that the air-resistance function F(t) is linear, and that C(i) =U(i). An arbitrary scaling here represents the fact that no particular units have been assumed for defining the conversion of electrical signals to sound waves. The following four equations then result:

$$D(i)=D(i-1)-C(i-1) \quad (6)$$

$$C(i)=W(i)+0.5(W(i+1)-W(i-1))*D(i)*dT \quad (7)$$

$$I(i)=-C(i)-(C(i)-C(i-1))*X+G(D(i)) \quad (8)$$

$$V(i)=I(i)*R+(I(i)-I(i-1))*Y+C(i) \quad (9)$$

The delay modulation and the diaphragm stress-strain curve are the only non-linear effects modelled in the equations listed above. The delay modulation is represented by the simple multiplicative parameter dT, and the diaphragm stress-strain curve is represented by a function G(D(t)).

The function G(D(t)) can be partitioned into a linear stress-strain curve of slope $G_0$ plus the non-linear remainder $G'(D(t))=G(D(t))-G_0D(t)$. The purpose of this is to enable the small-signal equations to be simplified to the linear equations:

$$D(i)=D(i-1)-C(i-1)$$
$$C(i)=W(i)$$
$$I(i)=-C(i)-(C(i)-C(i-1))*X+G_0*D(i)$$
$$V(i)=I(i)*R+(I(i)-I(i-1))*Y+C(i)$$

The linear parameters in the equations shown above can be determined by measurement. The determination of the S coil resistance and inductance parameters R and Y is straightforward as will be understood by one having ordinary skill in the art. The diaphragm mass and linear part of the diaphragm stress-strain curve can be determined by measuring the diaphragm's mechanical resonant frequency and Q factor when the loudspeaker is in its intended housing.

The small-signal parameters are then fixed and the non-linear parameters dT, representing delay modulation, and G'(D(t)), representing the non-linear part of the stress-strain curve, may be determined by large signal measurements. The delay modulation may be determined by using a spectrum analyzer to observe the intermodulation produced on a two-tone test between a low frequency sine wave signal that causes large diaphragm displacements and a high frequency sine wave signal that is most sensitive to phase modulation by the low-frequency diaphragm displacements.

The non-linear part of the stress-strain curve may be obtained by using a spectrum analyzer to observe the harmonic distortion of a large, low-frequency, sine wave signal as a function of amplitude and finding a function G'(D(t)) by trial and error that explains it. The function can be represented in a numerical signal processor such as a DSP by a look-up table. Alternatively, this curve can be directly determined by physical measurements of force or DC current required to displace the diaphragm a measured amount. The invention may include the provision of a diaphragm displacement or movement sensor for the purpose of assisting in real-time determination or adaptive updating of model parameters.

In practice, a typical stress-strain curve G'(D(t)) may be assumed to be known apart from a scaling factor for a particular loudspeaker. Likewise, it may be assumed that the linear model parameters resulting in particular diaphragm mechanical resonances are well known for a particular loudspeaker size and make. Small errors in small-signal parameters that effect small-signal frequency response are not of great consequence since any system is assumed to have some ability to adapt linear frequency responses to provide compensation. For example, a manual equalizer or tone control may be provided.

In a cellular telephone including a loudspeaker for hands-free operation, the linear frequency response from the loudspeaker to the microphone includes reflections from nearby objects, possible room resonances, and other distortions induced by the environment which are illustrated in FIG. 1 by the multi-path acoustic channel 18. These environmental distortions, known as echo or ring-around can be modeled by an echo filter such as an adaptive finite-impulse-response (FIR) filter.

Adaptive filters used in echo cancellation are discussed, for example in U.S. Pat. No. 5,237,562 to Fujii et al. entitled "Echo Path Transition Detection." Other echo cancelers including adaptive echo estimation or a finite impulse response filter are respectively discussed in U.S. Pat. No. 5,131,032 to Esaki et al. entitled "Echo Canceler and Communication Apparatus Employing the Same," and U.S. Pat. No. 5,084,865 to Koike entitled "Echo Canceller Having FIR and IIR Filters for Canceling Long Tail Echoes." Each of the three above cited patents are hereby incorporated in their entirety herein by reference.

The modeled distortions can be subtracted from the sound signal generated by the microphone to reduce the environmental distortions. The echo or ring-around is, however, imperfectly modeled due, in part, to the non-linear loudspeaker effects discussed above which are not modeled by the echo filter 16. Accordingly, imperfect echo cancellation results. Using the precompensating techniques derived above, however, the channel from electrical input to the precompensating filter 12 to the microphone 20 output may be linearized such that it is more accurately modeled by the echo filter 16, giving better echo cancellation.

It is now described with the aid of FIG. 1 how the precompensating filter 12 can be adapted in real time to adjust the non-linear distortion terms dT and G'(D(i)) so as to continuously reduce residual uncanceled echo-distortion residuals. FIG. 1 shows an input signal W(t) representative of a desired sound pressure wave being applied to a precompensating filter 12 according to the foregoing discussion in order to generate a precompensated loudspeaker input signal V(t). The precompensating filter 12 implements an inverse operation $\underline{H}^{-1}$ of an estimate $\underline{H}$ of the true non-linear transfer function $\underline{H}$ of the loudspeaker. Thus, if $\underline{H}$ and $\underline{H}^{-1}$ are perfectly modeled:

$$\underline{H}^{-1}(W(t))=V(t)$$

and $$\underline{H}(V(t))=W'(t)=W(t).$$

If $\underline{H}$ and $\underline{H}^{-1}$ are close approximations of the true functions, then the loudspeaker will transform precompensated input signal V(t) into sound pressure wave W'(t) which is a close approximation of the desired sound pressure wave represented by input signal W(t).

Due to errors in the model parameters, however, the estimate may not be exact and distortions may still exist in the sound pressure waveform. This waveform propagates through the acoustic multi-path channel 18 to the microphone 20 creating sound signal Z(t) having an echo or ring-around portion. The whole path from precompensating filter 12 input signal W(t) to microphone amplifier 36 output sound signal Z(t) is modeled by echo filter 16, and its coefficients, $a_1, a_2, a_3, \ldots, a_n$ are chosen to reduce the mean square error between its output estimated echo signal Z'(t) and the echo portion of signal Z(t). Z'(t) is preferably a close prediction of the echo portion of the signal Z(t) and may be subtracted from Z(t) to reduce the echo to a small residual component of signal E(t).

Practical implementations of such adaptive echo cancelers show increasing suppression of the residual echo portion of signal E(t) as the complexity of the echo filter 16 is increased. The complexity may be increased by increasing the number of coefficients $a_i$ used by the echo filter 16. A limit is reached, however, due to non-linear loudspeaker distortions that are not modeled by the echo filter when not also using precompensation means. Since a preferred embodiment of the present invention reduces such distortions by a precompensating filter 12, the residual echo portion of signal E(t) may be further reduced. If the precompensating filter 12 exactly canceled non-linear loudspeaker distortions, the residual echo portion of the signal E(t) could be reduced indefinitely by improving the linear channel modeling of echo filter 16.

A process is now described whereby the parameters of the loudspeaker model relating to non-linear effects may be updated or "learned" to reduce the residual echo portion of signal E(t) by improving the approximation of the inverse $\underline{H}^{-1}$ of the loudspeaker transfer function H thereby improving the precompensating filter operation. Corresponding segments of the signals V(t), W(t) and Z(t) are first collected in precompensating filter modifier 34 which may include a memory. In order to best estimate non-linear effects, large signal segments of these signals are preferably collected. In a telephone with a loudspeaker for hands free operation, the ratio of microphone output sound signal to loudspeaker signal may be processed to determine which party is speaking. The signal segments should preferably be selected when only the distant party is speaking so that the microphone sound signal Z(t) does not contain locally generated speech. Accordingly, the microphone sound signal Z(t) will be made up almost entirely of echo or ring-around components. The coefficients $a_i$ of the echo filter 16 are then chosen so that the filter transforms the segment of signal W(t) to as close a match as possible to the echo portion of signal Z(t). This transformed signal is labeled Z'(t).

Then, a modified waveform W'(t) is calculated using the coefficients that would be transformed to the actual echo portion of signal Z(t). One method of deriving the waveform W'(t) is to use the best available FIR approximation to the inverse FIR filter, or to solve a set of equations for W'(t) samples to be input in order to obtain a close match to Z(t) samples at the output.

By finding estimated parameters of the loudspeaker transfer function $\underline{H}$ that transforms the given precompensated input signal V(t) segment to the modified W'(t) waveform segment, a model that correctly precompensates at least one input signal segment W(t) may be obtained such that the overall channel from precompensating filter input through the loudspeaker and multi-path channel is approximately a linear channel. If the waveform W'(t) segment is sufficiently representative of all possible waveforms, then the precompensating filter operation may be correct for all other waveforms. This criteria may be achieved if the segments are long enough to contain many examples of waveforms and spectra.

It will now be explained how the model parameters can be updated so that a given precompensated input signal V(t) applied to the input node A of the loudspeaker modeled in FIG. 2 is transformed to a second given waveform W'(t) at output node B of the loudspeaker. The model of FIG. 2 is first used to compute the signals at nodes C' and D from the precompensated input signal V(t) applied at input node A. This may be performed by the following discrete-time equations:

$$I(i)=(A(i)+Y*I(i-1)-C(i-1))/(R+Y) \quad (10)$$

$$C(i)=(G(D(i-1))+X*C(i-1)-I(i))/(1+X) \quad (11)$$

$$D(i)=D(i-1)-C(i) \quad (12)$$

The inverse of equation (7) is obtained merely by reversing the sign of the delay modulation. Thus if:

$$C(i)=W(i)+0.5(W(i+1)-W(i-1))*D(i)*dT \quad (7)$$

then:

$$W(i)=C(i)-0.5(C(i+1)-C(i-1))*D(i)*dT. \quad (13)$$

The delay modulation parameter dT will now be updated such that equation (13) more accurately reproduces the given waveform W' (t). This is done by first precomputing the waveform:

$$B(i)=0.5(C(i+1)-C(i-1))*D(i),$$

and then finding dT such that the sum of the squares of W'(i)−C(i)+B(i)*dT is reduced. This value of dT is given by:

$$dT=-\frac{1}{N}\Sigma(B(i)*(W(i)-C(i))).$$

In other words, B(i) is correlated with W(i)−C(i) over i=1 to N samples.

The non-linear diaphragm spring function G(t) may now be updated as follows. Equations (6) and (7) are used to compute samples C(i) and D(i) of signals C(t) and D(t) that would produce the desired sound pressure waveform. Equation (10) is then used to compute samples I(i) of the signal I (t) given C(i) and the given signal V(t) as samples V(i). Next, equation (8) is inverted to read:

$$G(D(i))=I(i)+C(i)+(C(i)-C(i-1))*X$$

If function G(D(t)) is expressed as a polynomial $G_0*D(t)+G_1*D^2(t)+G_2*D^3(t)\ldots$, the coefficients may be determined by a conventional least-squares polynomial fitting procedure. Note that this also updates the linear parameter $G_0$, which affects the modeling of the mechanical resonant frequency. Alternately, the $G_0$ parameter can be left unchanged and only the non-linear coefficients $G_1$, $G_2$, . . . updated.

The method discussed above may require the calculation of an input waveform W'(t) to a given filter in order to obtain a given output signal Z(t) as accurately as possible. This effectively describes inverting the filter transfer function, which may not always be possible. Approximations to the inverse filter may be used if this approach is taken. These approximations may be computed, for example, by the techniques disclosed in Roberts & Mullis "*Digital Signal Processing*", Addison-Wesley (1987), Chapter 7, the disclosure of which is incorporated herein by reference.

An alternative approach is to note that the sound pressure waveform W'(t) or input signal W(t) at the input of the precompensating filter, which is an inverse of the loudspeaker model of FIG. 2, comprises of the sum of two parts due to the delay modulator 66, which is approximated by equation (13) as:

$$W(i)=C(i)-0.5(C(i+1)-C(i-1))*D(i)*dT.$$

The first part of the equation C(i) is the non-delay-modulated waveform, and the second part is a product of the derivative and the integral of the same which is scaled by the delay modulation coefficient dT. Since the echo filter is linear, its output Z'(t) is the sum of outputs obtained by filtering the first and second parts of equation (13) separately. C(i) was originally computed by equation (7) from the waveform W'(t), and D(i) was computed using equations (6) to (9). Therefore, the second part of (13) may be computed as:

$$Q(i)=0.5(C(i+1)-C(i))*D(i).$$

C(i) and Q(i) are then filtered separately by using the echo filter 16 in the forward direction to obtain samples of two signals $Z_1(t)$ and $Z_2(t)$ respectively. The discrete-time samples are denoted by $Z_1(i)$ and $Z_2(i)$. ALPHA times $Z_1(t)$ plus BETA times $Z_2$ (t) is now calculated such that (ALPHA) $*Z_1(t)$+(BETA) $*Z_2(t)$ equals Z(t) as closely as possible. The solution for ALPHA and BETA that reduces the mean square error in matching Z(i) is:

$$ALPHA = \frac{de - bf}{ad - bc}\ ;\ BETA = \frac{af - ce}{ad - bc}$$

where $$a = \sum_i [Z_1^2(i)]$$

$$d = \sum_i [Z_2^2(i)]$$

and $$b = c = \sum_i [Z_1(i) * Z_2(i)].$$

Thus, new values ALPHA and BETA for the two signals C(i) and Q(i) are desired to be produced by the model of FIG. 2 given the same precompensated input signal V(t). This channel is to be effected by updating the model parameters. However since a change in overall scaling can be effected by scaling the FIR filter coefficients, we will only update the ratio of the two signals C(i) and Q(i) produced by the model by updating the delay modulation parameter dT to a new value BETA/ALPHA. At the same time, the FIR coefficients of echo filter 16 are all multiplied by ALPHA. This results in the desired signals $Z_1(t)$ and $Z_2(t)$ still being produced as a sum signal that most closely matches Z(t) at the echo filter 16 output. Furthermore, the residual echo portion of signal E(t) will be reduced compared to its previous value through having improved the estimate of the non-linear delay modulation occurring in the loudspeaker. The diaphragm spring stress-strain polynomial coefficients may also be re-estimated without requiring inversion of the echo filter 16.

Using the same precompensated input signal V(t) to the model of FIG. 2, the output waveforms W(t) and $W_1(t)$ are calculated with the original and a slightly modified polynomial coefficient. For example, the cubic coefficient $G_2$ is increased by 1/16th of its value. The change in waveform $W_1(t)-W(t)$ is then filtered by the echo filter 16 to obtain a signal $Z_3(t)$. The amount GAMMA of $Z_3(t)$ is then found which causes Z'(t) to more closely match Z(t). That amount is given by the following equation:

$$\frac{\sum_i [Z_3(i) * E(i)]}{\sum_i [Z_3^2(i)]}$$

The cubic coefficient is then modified by adding GAMMA/16 of its original value to its existing value in order to create the desired signal $Z_3B(t)$ to reduce the residual echo portion of signal E(t).

Thus it has been shown above how a non-linear model of a loudspeaker may be modeled in terms of a number of parameters and inverted to produce a procedure for generating a precompensated loudspeaker input signal that will reduce the effects of loudspeaker distortion. It has also been disclosed how loudspeaker linear and non-linear model parameters can be measured for the purpose of tuning a precompensating filter, on installation for example. This specification also discloses how sound can be converted to a microphone output sound signal by using a microphone and then used to adaptively update the loudspeaker model parameters in order to successively improve the overall linearity of the combination of the loudspeaker and precompensating means. Such an invention can be useful in providing audio systems with improved sound fidelity as well as in improving echo cancellation in a loudspeaker telephone or cellular radiotelephone having a full-duplex, hands-free function.

As would be understood by a person skilled in the art, variations in the models and attendant equations can be made to suit particular applications or acoustic loudspeakers. Furthermore, the invention can be implemented using special analog signal processing circuits, special digital signal processing circuits with A-to-D and D-to-A convertors, general purpose programmable digital signal processing circuits, or combinations of the above. Accordingly, many modifications and other embodiments of the invention will come to one skilled in the art having the benefit of the teachings presented in the foregoing descriptions and the associated drawings. Therefore, it is to be understood that the invention is not to be limited to the specific embodiments disclosed, and that modifications are intended to be included within the scope of the appended claims.

That which is claimed is:

1. An adaptive precompensating audio system comprising:

a loudspeaker for producing a sound pressure wave in response to an audio input signal which is applied to an audio input thereof, said sound pressure wave including a desired linear component which is a linear function of said audio input signal, and an undesired non-linear component which is a non-linear function of said audio input signal;

a precompensating filter for precompensating an input signal representative of said desired linear component to produce a precompensated output signal, and for applying said precompensated output signal to said audio input such that said undesired non-linear component is reduced;

a microphone for converting said sound pressure wave into a sound signal; and a precompensating filter modifier responsive to said sound signal and said input signal for modifying said precompensating filter, to further reduce said undesired non-linear component;

wherein said precompensating filter comprises means for performing a transformation of said input signal to produce said precompensated output signal, said transformation being an estimate of an inverse non-linear transfer function of said loudspeaker.

2. An adaptive precompensating audio system according to claim 1 further comprising:

an echo filter, responsive to said input signal, for generating an estimated echo signal; and subtraction means for subtracting said estimated echo signal from said sound signal such that an echo portion of said sound signal is reduced.

3. An adaptive precompensating audio system according to claim 1 wherein said precompensating filter comprises an echo filter, responsive to said input signal, for generating an estimated echo signal, and subtraction means for subtracting said estimated echo signal from said sound signal such that an echo portion of said sound signal is reduced.

4. An adaptive precompensating audio system according to claim 2 wherein said echo filter comprises modification means for modifying said echo filter in response to said input signal, said estimated echo signal, and said sound signal, to further reduce said echo portion of said sound signal.

5. An adaptive precompensating audio system according to claim 2 wherein said echo filter comprises a finite-impulse-response filter.

6. An adaptive precompensating audio system according to claim 1 wherein said precompensating filter comprises a digital signal processor.

7. An adaptive precompensating audio system according to claim 1 wherein said inverse non-linear transfer function represents one of a delay modulation of said loudspeaker and a diaphragm stress-strain curve of said loudspeaker.

8. An adaptive precompensating audio system comprising:

output transducer means for producing a sound pressure wave in response to an audio input signal which is applied to an audio input thereof, said sound pressure wave including a desired linear component which is a linear function of said audio input signal, and an undesired non-linear component which is a non-linear function of said audio input signal;

precompensating means for precompensating an input signal representative of said desired linear component to produce a precompensated output signal, and for applying said precompensated output signal to said audio input such that said undesired non-linear component is reduced; and precompensating means modifier, responsive to said sound pressure wave and to said input signal, for modifying operation of said precompensating means, to further reduce said undesired non-linear component;

wherein said precompensating means comprises means for performing a mathematical transformation of said input signal to produce said precompensated output signal, said mathematical transformation being an estimate of an inverse transfer function of said output transducer means.

9. An adaptive precompensating audio system according to claim 8 wherein said precompensating means comprises a digital signal processor.

10. An adaptive precompensating audio system according to claim 8 wherein said precompensating means modifier comprises an input transducer for converting said sound pressure wave into a sound signal.

11. An adaptive precompensating audio system according to claim 10 further comprising:

echo filter means, responsive to said input signal, for generating an estimated echo signal; and combination means for combining said estimated echo signal and said sound signal, such that an echo portion of said sound signal is reduced.

12. An adaptive precompensating audio system according to claim 11 wherein said echo filter means comprises modification means for modifying said echo filter in response to said input signal, said estimated echo signal, and said sound signal, such that said echo portion of said sound signal is further reduced.

13. An adaptive precompensating audio system according to claim 11 wherein said echo filter means comprises a finite-impulse-response filter.

14. An adaptive precompensating audio system comprising:

output transducer means for producing a sound pressure wave in response to an audio input signal which is applied to an audio input thereof, said sound pressure wave including a desired linear component which is a linear function of said audio input signal, and an undesired non-linear component which is a non-linear function of said audio input signal;

precompensating means for precompensating an input signal representative of said desired linear component to produce a precompensated output signal, and for applying said precompensated output signal to said audio input such that said undesired non-linear component is reduced, wherein said precompensating means comprises means for performing a transformation of said input signal to produce said precompensated output signal, said transformation being an estimate of an inverse transfer function of said output transducer means;

input transducer means for converting said sound pressure wave into a sound signal including an echo portion; and echo filter means for generating an estimated echo signal in response to said input signal and combining said estimated echo signal with said sound signal to reduce said echo portion of said sound signal, and for modifying operation of said precompensating means in response to said output electrical signal and said input signal, to further reduce said undesired non-linear component.

15. An adaptive precompensating audio system according to claim 14 wherein said echo filter means also comprises an echo modifier responsive to said input signal, said estimated input signal, and said sound signal for modifying operation of said echo filter means to further reduce said echo portion of said sound signal.

16. An adaptive precompensating audio system according to claim 14 wherein said echo filter means comprises a finite-impulse-response filter.

17. An adaptive precompensating audio system according to claim 14 wherein said precompensating means comprises a digital signal processor.

18. A method for adaptively precompensating for distortion in an audio system including a loudspeaker which produces a sound pressure wave in response to an audio input signal, the sound pressure wave including a desired linear component which is a linear function of the audio input signal, and an undesired non-linear component which is a non-linear function of the audio input signal, said method comprising the steps of:

providing an input signal representative of said desired linear component;

performing a precompensation function on said input signal to produce a precompensated output signal, wherein said step of performing said precompensation function comprises performing a transformation of said input signal to produce said precompensated output signal, said transformation being an estimate of an inverse transfer function of said loudspeaker;

applying said precompensated output signal to said loudspeaker to produce an output sound pressure wave such that said undesired non-linear component is reduced;

determining a difference between a desired sound pressure wave and said output sound pressure wave; and adapting said precompensation function in response to said difference to further reduce said undesired non-linear component.

19. A method according to claim 18 further comprising the steps of:

performing an echo estimation function to generate an estimated echo signal in response to said input signal;

converting said output sound pressure wave to produce a sound signal including an echo portion; and subtracting said estimated echo signal from said sound signal to reduce said echo portion of said sound signal.

20. A method according to claim 19 further comprising the step of adapting said echo estimation function in response to said input signal, said output sound pressure wave, and said estimated echo function, to further reduce said echo portion of said sound signal.

21. A method according to claim 19 further comprising the step of comparing said input signal with said sound signal to determine when said sound signal substantially comprises only said echo portion, and wherein said adapting step is performed when said sound signal substantially comprises only said echo portion.

22. A method according to claim 18 wherein said providing step comprises the step of providing a test signal.

23. A method according to claim 18 wherein said precompensation function comprises an estimate of a mathematical inverse of a non-linear transfer function of said loudspeaker.

* * * * *